United States Patent [19]
Lange et al.

[11] Patent Number: 5,768,354
[45] Date of Patent: Jun. 16, 1998

[54] FRAUD EVALUATION AND REPORTING SYSTEM AND METHOD THEREOF

[75] Inventors: Lauretta Lange, Atkins; Nancy McCoy; Daniel Roberts, both of Cedar Rapids; Lawrence Richard Smith, Walford; Arthur Lance Springer, Waterloo, all of Iowa

[73] Assignee: MCI Communications Corporation, Washington, D.C.

[21] Appl. No.: 382,415

[22] Filed: Feb. 2, 1995

[51] Int. Cl.$^6$ ............................................. H04M 3/00
[52] U.S. Cl. ............................................. 379/189; 379/112
[58] Field of Search ............................... 379/133, 189, 379/112, 113, 134, 136, 139, 196–8

[56] References Cited

U.S. PATENT DOCUMENTS

| 4,001,513 | 1/1977 | Naylor. |
| 4,159,400 | 6/1979 | Hall et al.. |
| 5,345,595 | 9/1994 | Johnson et al.. |
| 5,495,521 | 2/1996 | Rangachar ............................... 379/95 |

OTHER PUBLICATIONS

Wiederhold, Gio., Database Design, McGraw Hill computer science series, pp. 267–268, 1983.
Cellular Business, V9, N12, p. 24(6), Billing Systems: They oren't Just for Billing Anymore, Hank Mishkoff Nov. 1992, ISBN 0741–6520.

Primary Examiner—Gail O. Hayes
Assistant Examiner—Barton L. Bainbridge

[57] ABSTRACT

Upon receipt of a billing detail record from either an operator or automatic console, a host receiver of the fraud evaluation and reporting system of the instant invention would route a record to either a bad billed number module, a call intercept module or a fraud filter module. Depending on where the record is routed, a determination is made on whether the account number is bad or whether the account number is being used by a fraudulent user. Moreover, calls may be intercepted to determine whether specific predefined thresholds have been exceeded and whether or not subsequent calls are to be processed or denied. Furthermore, by means of the fraud filter processes, various alerts may be generated by applying thresholds relating to different products and division with the account number.

28 Claims, 11 Drawing Sheets

| TIMESTAMP | DV | PR | AL | BILLED | ORIGINATING | TERMINATING | SI | USAGE |
|---|---|---|---|---|---|---|---|---|
| 07/15 15:21 | 10 | 08 | 3 | 12345678901234 | 813-934-2670 | 617-581-3435 | 12 | 20 |
| 07/15 15:21 | 10 | 01 | 5 | 12345678901234 | 516-466-7777 | 709-52300719 | 12 | 20 |
|  |  |  |  |  |  | CANADA |  |  |
| 07/15 15:21 | 10 | 99 | 5 | 12345678901234 | 912-232-7500 | 352-378640 | 15 | 1 |
|  |  |  |  |  |  | LUXEMBOURG |  |  |
| 07/15 15:21 | 10 | 01 | 8 | 12345678901234 | 401-894-9952 | 706-878-2209 | 15 | 2 |
| 07/15 15:21 | 70 | 01 | 8 | 12345678901234 | 805-295-9002 | 310-995-0680 | 02 | 2 |
| 07/15 15:21 | 70 | 01 | 12 | 12345678901234 | 214-960-0460 | 52-5-5252828 | 01 | 1 |
|  |  |  |  |  |  | MEXICO CITY, MEXICO |  |  |
| 07/15 15:21 | 10 | 99 | 3 | 12345678901234 | 700-512-0600 | 504-654-2611 | 40 | 2 |
| 07/15 15:21 | 20 | 01 | 12 | 12345678901234 | 718-389-8639 | 48-16512716 | 14 | 1 |
|  |  |  |  |  |  | POLAND |  |  |
| 07/15 15:21 | 10 | 99 | 3 | 12345678901234 | 406-228-8213 | 208-756-4300 | 60 | 2 |
| 07/15 15:20 | 40 | 01 | 8 | 12345678901234 | 813-647-3552 | 813-689-0811 | 11 | 2 |
| 07/15 15:20 | 10 | 01 | 8 | 12345678901234 | 914-791-4436 | 914-794-4800 | 14 | 2 |
| 07/15 15:20 | 20 | 01 | 8 | 12345678901234 | 609-627-3091 | 609-342-9517 | 14 | 2 |
| 07/15 15:20 | 40 | 01 | 3 | 12345678901234 | 803-784-3645 | 803-686-5877 | 11 | 60 |

Enter=Refresh    PF3=Exit    PF23=Cancel All Alerts

FIG. 7

| Alert No. Threshold Unit of Time | | | Display Color | Alert Type |
|---|---|---|---|---|
| Hours | Days | Weeks | | |
| 1 | NA | NA | Green on black | Originating hot number |
| 2 | NA | NA | Black on turquoise | Terminating hot number |
| 3 | 23 | 33 | Black on yellow | Excessive billed number usage<br>Note : If "*" appears next to the alert, number is in Billed Number Override file. |
| 4 | 24 | 34 | Turquoise | Excessive originating number usage<br>Note : If "*" appears next to the alert, number is in Originating Number Override file. |
| 5 | 25 | 35 | Red on black | International to nontargeted countries |
| 6 | NA | NA | Pink | Invalid attempts (hacking) |
| 7 | 27 | 37 | Black on white | International to targeted countries |
| 8 | NA | NA | Black on red | Geographic dispersion |
| 9 | NA | NA | Not in use | International originating ANI |
| 10 | NA | NA | Yellow on black | Suspect intercept/Caller passed voice verification |
| 11 | NA | NA | Pink on black | Suspect intercept/Caller failed voice verification |
| 12 | NA | NA | White on black | Call intercept/Card passed voice verification |
| 13 | NA | NA | Turquoise on black | Call intercept/Card failed voice verification |

FIG. 8

FRAUD EVALUATION AND REPORTING SYSTEM AND METHOD THEREOF

FIELD OF THE INVENTION

The present invention relates to telecommunications systems and more particularly to a system and a method therefor of monitoring in real time calls into the telecommunications network so as to detect and analyze fraudulent activities, both with respect to the billing account and the originating numbers, by means of a number of different processes.

BACKGROUND OF THE INVENTION

The telecommunications industry, from statistics collected for the last few years, faces fraud that cost the industry billions of dollars a year. Such fraudulent activities include calling card fraud, blue box, PBX fraud, subscription fraud, call forwarding, operating services, looping, hacking and seller fraud, among others. The industry, therefore, is in constant need of finding ways to prevent such fraudulent activities.

Prior to the instant invention, a system for evaluating fraud used by the assignee of the instant invention had performance that tended to be relatively slow, as all information was stacked into single divisional queue. In addition, that system also lacked the flexibility insofar as the users do not have the capability to establish criteria upon which to base decisions for taking actions to prevent any fraudulent activity. And inasmuch as the data collected for the prior fraud evaluation system are all fed into a single queue, the performance of the various fraud detection applications, which depend on different types of data, are slowed, so much so that the amount of time required to detect fraud was not what it should be. This is of utmost import insofar as time is quite critical to stopping fraud. In other words, the faster a fraud analyst can obtain information regarding a fraudulent activity, the faster she can react to stop the fraudulent process.

BRIEF DESCRIPTION OF THE PRESENT INVENTION

The instant invention fraud evaluation and reporting (FEAR) system, and the method therefor, provides the operators (analysts or users) of the system the capacity of monitoring call traffic in real time to detect fraudulent activity. The instant invention also allows the users a higher degree of flexibility in establishing the criteria upon which to base decision for taking action to prevent such fraudulent activity. This is accomplished by providing each user the capability to determine what products to monitor and to set limits on the use of such products. Specific numbers and geographic locations can also be defined by the user as suspect; and thresholds can be established by the user on the number of calls of a particular type of product (or service) within specified units of time. When calling activity differs from or exceeds the user defined criteria, alerts are generated by the system.

Specifically, as implemented, the present invention system utilizes a host receiver for routing bill detail records (BDRs), which are generated for each call placed to the network, to various different application processes to determine the status of the call to which the record is associated. For this routing process, the host receiver will determine from the header of each record whether it is to be routed to a bad billed number (BBN) module, a call intercept module or a fraud filter module for further processing. The record is routed to the BBN module for processing if there is indication at the header, or somewhere else, of the record that the account or bill number is bad. Upon receiving a bad billed number record, the BBN module will determine whether the originating number has previously been used with a BBN, whether there is an override threshold on file for this record with respect to this originating number, and compute whether the particular call has exceeded the usage threshold within a given time period. And if the BBN module does determine that the threshold is met, an alert is written to an alert table from which the data is presented to the fraud analyst for evaluation.

If the record retrieved by the host receiver is found to be a BDR, then the record is routed to another queue so as to be retrieved, one at a time, by the fraud filter module. Upon retrieval, the fraud filter module would make a determination of whether to associate the record with one of a plurality of billed number queues (divisions) and originating number queues (divisions). The respective billed number queues and originating number queues are further subdivided into corresponding even and odd queues for speedier processing. The records associated with the billed number queues are processed by a billed number module, while the records associated with the originating number queues are processed by an originating number module.

The operation of the billed number module and the originating number module are substantially the same. For the billed number module, a determination is first made on whether the billed number noted on the record is on file. A counter is then incremented to keep count of the number of times the particular billed (or account) number has been used within a given predefined period of time. Global thresholds are read to determine thresholds for specific divisions and call type. The billed number is also used to read an exception file to determine if unique thresholds are to be applied. Comparisons are then made with either the exception thresholds or, if so indicated by the file, the global thresholds. Anytime a threshold is exceeded, an alert signal is sent to the alert table. Aside from using an originating number exception, the originating number module functions substantially the same as the bill number module.

If the host receiver determines that the header of record designates a BDR with a call intercept indication, the call is routed to the call intercept module in which the caller is queried to determine if he/she is a legitimate caller. In addition, the card number used by the caller may be checked against the card numbers stored in an intercept file to determine whether future calls should be denied or completed.

It is therefore an objective of the present invention to provide a system, and method therefor, which offers the operators of the system the ability to monitor call traffic in real time to detect fraudulent activity.

Is it yet another objective of the present invention to allow the operators of the system a high degree of flexibility in establishing criteria upon which to base decisions for taking actions to prevent fraudulent activity by allowing the operators to determine what products to monitor and set limits on the use of such products.

It is yet a further objective of the present invention to provide a system that has high performance response time so that fraudulent activities are promptly prevented.

BRIEF DESCRIPTION OF THE DRAWINGS

The above mentioned objectives and advantages of the present invention will become more apparent and the invention itself will be best understood by reference to the following description of an embodiment of the invention taken in conjunction with the accompanying drawings, wherein:

FIG. 7 is an exemplar display of the screen of the alarm monitor shown in FIG. 2; and FIG. 8 is a table identifying the types of alert numbers and the various thresholds noted on the exemplar screen of FIG. 7.

DETAILED DESCRIPTION OF THE PRESENT INVENTION

Figure 1:
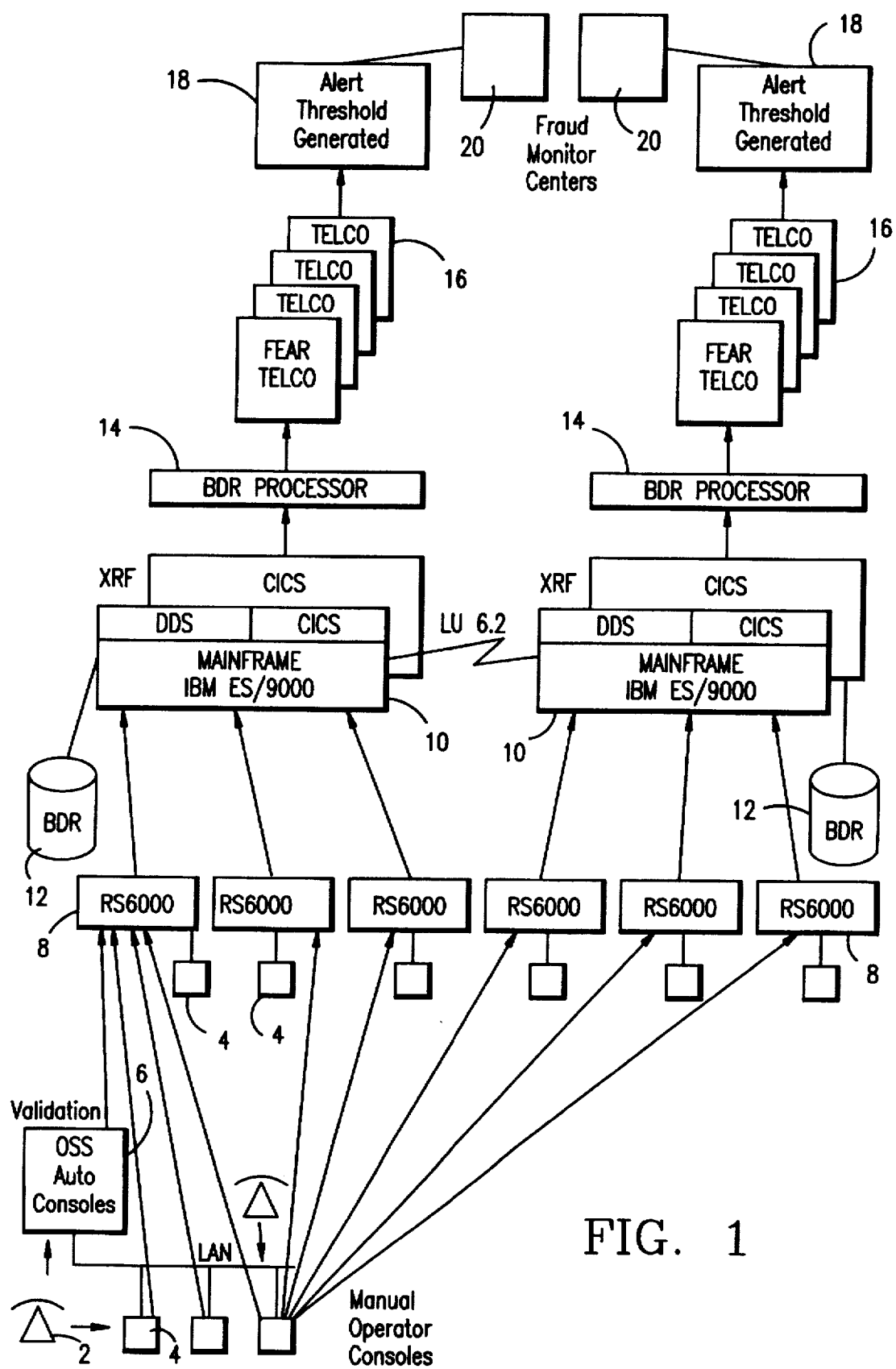
FIG. 1 is a block diagram illustrating the environment in which the instant invention components reside.

With reference to FIG. 1, the environment in which the instant invention system operates is provided. As shown, when a subscriber 2 to makes a special service phone call to the telecommunications network, he/she is routed to either a manual operating console 4 where he can converse with an operator or an automatic operations support systems (OSS) console 6. Once the call is set up and the call is routed out of the network to a local switch, a record, otherwise known as a billing detail record (BDR), is made and provided to one of a plurality of RS6000 application based database servers 8. Each of the records is then provided to each of mainframe processors 10, each being an IBM ES/9000 computer. Each of the processors 10 has attached thereto a database BDR store 12 for storing the BDRs. Each processor 10 further has as a part thereof a database distribution system (DDS) and a customer information control system (CICS) by which transactions may be submitted from remote computers to the mainframe processor for processing thereat. Each of the mainframe processors 10 provides redundancy for the other, as each is capable of processing by itself. Thus, each of the mainframe processors 10 is fully functional and has the same records as the other. Since each of the processors 10 and the components associated therewith are the same, the discussion below is with reference to only one of the processors 10.

By means of a transmit reference file (XRF), processor 10 (whichever one) distributes the BDRs to a BDR processor 14 which, although not shown, includes a queue into which the BDRs are stacked. Depending on various parameters which may include for example the type of accounting office, the type of credit or calling card, the region of the country, the BDRs are designated as being assigned to the various telcos (or divisions or queues) 16 from which different processes may be performed to determine whether or not fraudulent activity is associated with the call from which the BDR is generated. If fraudulent activity is deemed likely, depending on the various criteria, an alert signal is provided by an alert generator 18 and sent to the fraud monitor centers 20 where a number of fraud analysts each responsible for specific telco(s), or division(s), would analyze the alert signals per displays on a screen. From the alert displays the analysts would determine what action, if any, needs to be taken.

Figure 2:
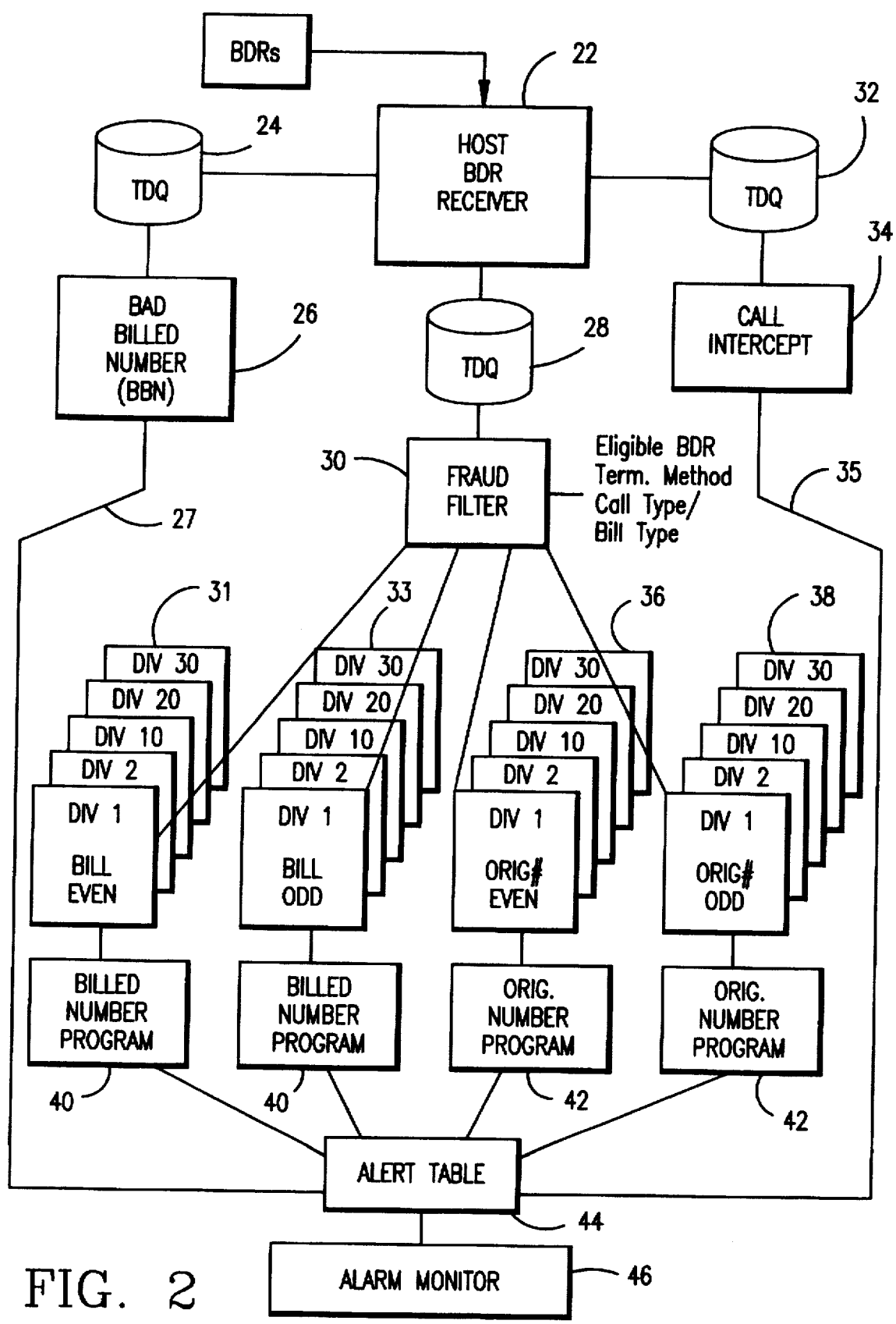
FIG. 2 is a diagram illustrating the different modules of the instant invention system.

FIG. 2 provides in more detail the specifics of the present invention. As shown, the BDRs are provided, or retrieved, by a host BDR receiver 22. Each of the billed detail records has a header to which different identifications may be made of that record. For example, a record may carry a BDR designation, a BDR with call intercept designation (this is the instance where the call intercept flag is raised or set in the record), or a bad bill number (BADBN) or bad account number designation.

Upon receipt of each record, host receiver 22 would read the header of the record (or wherever the designations is located on the record) to determine where to route that record. For example, as shown in FIG. 2 and also illustrated in FIG. 3A, if a record carries at its header a designation of BADBN, host receiver 22 would route that record to a first transient data queue (TDQ) or store 24. This record is then retrieved by the bad billed number (BBN) module 26. And if the header of the record carries a BDR identifier and its call intercept flag is set, that record would be routed by host receiver 22 to yet a third TDQ 32, which is connected to a call intercept module 34. On the other hand, if the header of the record carries an identifier of BDR, then host receiver 22 would direct that record to a second TDQ 28, from where a fraud filter module 30 would retrieve, one at a time, the records stored in TDQ 28. Like the BBN module 26 and fraud filter module 30, call intercept module 34 would retrieve the records stored in TDQ 32 one at a time for further processing. It should be appreciated that although a single TDQ is shown for each of modules 26, 30 and 34, in actuality, there may be a number of TDQs where record data may be routed for each of those modules.

Further shown in FIG. 2 are a number of divisions (which are also memory stores or TDQs) communicatively connected to fraud filter module 30. Each of the divisions in actuality may represent a telco located at a specific geographical location, such as the west coast, mid-west or northeast sections of the country—or a company to which a credit or calling card is associated. In other words, each division may have stored in its database a plurality of account or billing numbers which only that division has. Thus, anytime that a call is placed using an account number that is assigned to a given division, the particular products, thresholds and other criteria associated with that given division is used to determine the validity of the account number.

In essence, therefore, by providing a plurality of divisions, better granularity is obtained. This is particularly useful for enhancing the performance of the system. For example, assume that there are 10 million outstanding calling cards and 10 divisions. Further assume that 1 million of the various ones of the calling cards are associated with each of the 10 different divisions. Naturally, if a call identifying one of the 10 divisions comes into the network, the evaluation of any fraudulent activity relating to that call would be done with respect to the data stored for the account number of that call from the division, i.e., 1 out of 1 million choices. However, if there are no divisions, all of the cards would have to be assigned to a single queue. Consider then the problem that was faced with earlier fraud evaluation systems which need to examine the records seriatim from a single queue. Needless to say, the prior system provides a relatively slow evaluation process. Thus, by dividing the example number of calling cards or account numbers into various divisions, a much quicker assessment of the various records is achieved.

As touched on above, in addition to having specific account numbers assigned to the respective divisions, each of the divisions also has its own product (or service) and its own set of thresholds. The product and the thresholds will be described in more detail later with reference to the BBN, fraud filter and call intercept modules.

As further shown in FIG. 2, the divisions are designated as either bill number divisions or originating number divisions. The bill number or originating number divisions are further shown to be divided into respective sets of even and odd divisions. By thus dividing the divisions into even and odd sets and further executing the two modules, namely the billed number module and the originating number module, under the fraud filter module, the performance speed of the instant invention system is further enhanced. For identification purposes, the bill number even divisions are designated 31, the bill number odd divisions designated 33, the originating number even divisions designated 36 and the originating number odd divisions designated 38. Further, the billed number modules are designated 40 while the originating number modules are designated 42.

Also shown in FIG. 2 is an alert table 44 which is a store for receiving the various alert signals or data being provided by the BBN module 26, the call intercept module 34, the billed number module 40 and the originating number module 42. Shown connected to alert table 44 is an alarm monitor 46 one of whose exemplar screens is shown in FIG. 7.

Focus now to FIGS. 3A–3C and FIG. 4 where the operations of fraud filter module 30, billed number module 40 and originating number module 42 are further described.

Figure 3A:
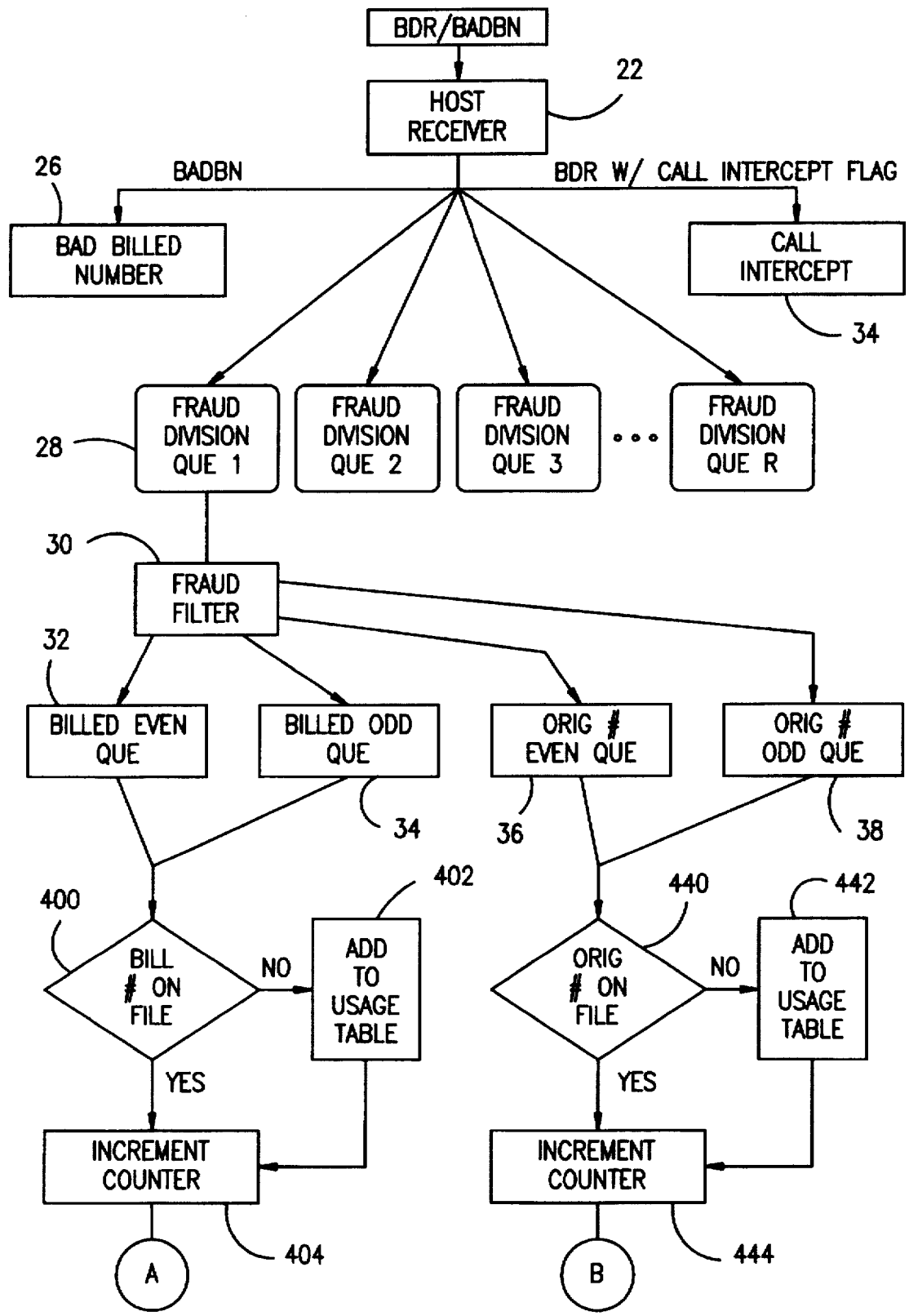
FIGS. 3A–3C provide a flow chart illustrating the processes of the instant invention and particularly the modules relating to the billed number and originating number applications.

As shown in FIG. 3A, a record of a call, identified as BDR/BADBN in this figure, is provided to host receiver 22. As was stated before with reference to FIG. 2, if the record has a BADBN header identifier, that record is routed to bad billed number module 26. If, however, the record has a BDR header with its call intercept flag set, that record is routed to call intercept module 34. Finally, if the record has a BDR header, that record is routed to the various fraud division queues such as 28. There may in fact be a plurality of TDQs, as a number of fraud filters may be incorporated into the system of the present invention. As shown and discussed, the various records provided to fraud filter 30 are paired with the various divisions or queues for determining the product type and the thresholds to which the record usage is to be compared. For the sake of simplicity in FIG. 3A, only one billed number even queue, one billed number odd queue, one originating number even queue and one originating number odd queue are shown. The operations under which fraud filter 30 directs the various incoming records to the different queues are discussed hereinbelow with reference to FIG. 4.

In brief, fraud filter performs as its name implies, i.e. filtering out information that are not necessary and routing the records to the appropriate modules. When a BDR is input to fraud filter 30, the filter process begins, as designated by operational block 302. The incoming record ordinarily carries a call type and a bill type. The call type contained in the record is compared with the call types that are prestored in a file or table, not shown, per operational block 304. If the call type in the incoming record matches one of the predefined call types, the filter process proceeds to block 306 where a determination is made on whether the bill type of the record matches one of the predefined bill types stored in the file or table. If the bill type of the record does match one of the predefined bill types, then the record is discarded at block 308, as there is no longer any need for further processing of that record.

If either or both of the call type and bill type are found not to match the prestored call types and bill types, the filter process would next proceed to the decision block 310 whereat a check is made on whether the bill type of the record represents a Bell operating company (boc) card. To do this comparison, the numbering plan area (NPA) and the NXX of the billed number is checked. If it does match the NPA/NXX format, depending on the format of the record, the record is routed to a particular division for further processing. Oftentimes this involves the alteration of the division associated with the record, as done in block 312, so that the record is checked against the setting of a given division queue whose threshold and product types are different from the division to which the record originally was associated with.

Oftentimes, this altering of the division of a record is done in order to route calls to a less busy area so as to balance the call traffic of the network. For example, suppose the operators of the network want to monitor a particular traffic from a particular area for certain calling cards. Further suppose that the operators, from their monitoring, find that some of those divisions are busy. Furthermore assume that the operators notice that one of the other divisions does not have much traffic. Given that, the operators, or the fraud analysts, will rearrange the traffic flow such that all of the cards with a particular NPA/NXX format will be processed through that other not so busy division so that the fraud analyst(s) responsible for that division can monitor those calls more closely. However, it should be noted that once the call has been associated with a different division, the product types and the thresholds associated with that division will be used to evaluate the account number of the call. That notwithstanding, it should be appreciated that a fraud analyst does have the means to change those thresholds and/or the product types.

If it is determined that the call is not a special product, the billing number of the record is checked at block 324. If the billing/account number is found to be a valid number, whether the last digit of that billing number is even or odd is next checked per decision block 326. If the billing number of the record is found to be even, the record is routed to the even billing number queue 32. If the billing number is found to be odd, the record is routed to the odd billing record queue 34.

The record is then checked for the originating number validity in block 328. A determination is then made on whether or not the originating number is even or odd in block 329. An odd originating number, as shown, is fed to the originating number odd queue 38, while an even originating number is routed to the originating number even queue 36.

Figure 3B:
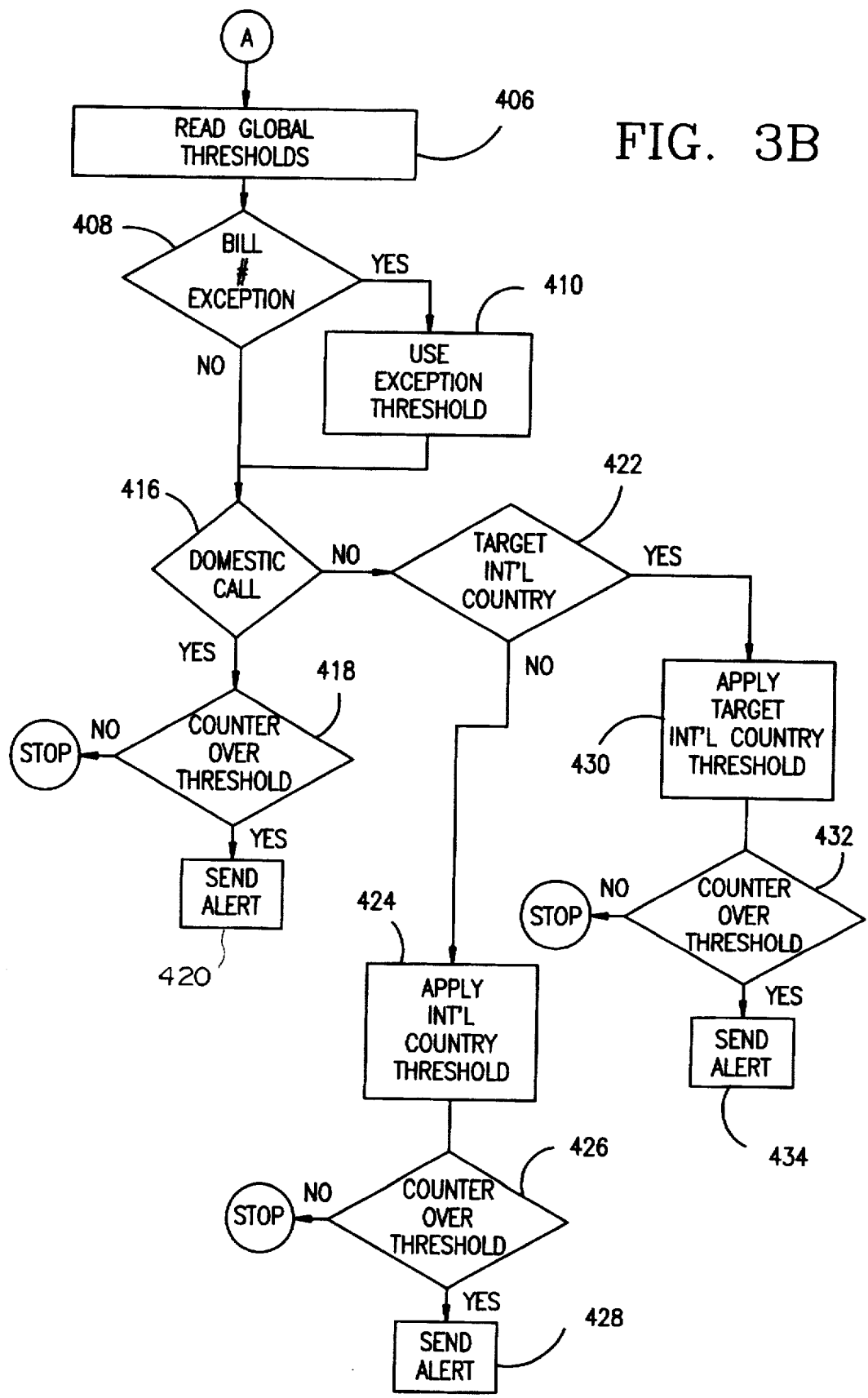

Having thus described the operations of the fraud filter module 30, return to FIG. 3A for the discussion of the billed number module 40 and the originating number module 42. Start with decision block 400. There it can be seen a decision is made on whether the billing number (or account number) is found to be present in a file. If it is not, that bill number is added to the usage table per block 402. Thereafter, a counter which represents the number of times that the billing number has been used is incremented in block 404. The counter is likewise incremented if the bill number is found to be already on file. As shown in FIG. 3B, global thresholds and exception thresholds are next read per block 406. For the embodiment of the instant invention, the global thresholds are assumed to be for domestic calls, international country calls, and target international country calls.

Continuing with the operations of the billed number module 40, the next operation that takes place is a determination of whether there is a bill number exception per decision block 408. A bill number exception occurs if there has been decided previously that a special threshold needs to be provided for a particular account number. For example, assume ordinarily a threshold for a billing number, such as for a domestic call, is 10 for each hour. In other words, if that account number is used to place domestic calls more than 10 times within an hour, an alert signal would be sent. Now assume that it has been determined that that billing number is assigned to a salesman who may very well make more than 10 domestic calls per hour, for example on average the salesman makes 20 calls per hour. Thus, a bill number exception threshold for that bill number may be set at 20 as indicated in block 410. Hence, the 21st call placed within an hour using that particular bill number would be deemed to be over the threshold, and an alert is sent. Of course, if the call usage based on that bill number does not exceed the exception threshold of 20 calls per hour, the operation of the billed number module is terminated for that particular bill number record.

If there is no bill number exception threshold, the global thresholds are used to determine whether there is fraudulent activity associating with the call. To begin with, whether that call is a domestic call is determined in block 416. If it is, the threshold set for domestic calls, for example the 20 calls within an hour as mentioned above, is compared with the call at decision block 418. If the call being placed has not exceeded the usage set for the given time limit, the operation of the billed number module is stopped. However, if it does exceed the set threshold, an alert is sent per block 420 to the alert table 44.

If it is determined that the call being made is not a domestic call, a determination is made on whether or not the call is directed to a target international country, per decision block 422. If it is not, the standard international country threshold is applied in block 424. Such a threshold may be for example two international calls per hour for the particular bill number. If the threshold has not been exceeded, the operation stops. If it has, an alert is sent, per block 426, to the alert table 44.

If it is determined that the call is placed to a target international country, for example Columbia, India or some other country where there is a substantial amount of fraudulent activity, the target international country threshold is applied per block 430. A determination is next made per decision block 432 on whether or not the target international country threshold is exceeded. If it is not, the operation of the billed number module is stopped. If it does exceed the prescribed threshold, an alert signal is sent per block 434 to the alert table 44.

The operations of the originating number module 42 is quite similar to those of the billed number module 40. In particular, starting at FIG. 3A, focusing on the record being provided by originating number even and odd queues 36 and 38, a determination is made at decision block 440 on whether or not the originating number is on file. If it is not, it is added to the originating number usage table per block 442. Irrespective of whether the originating number is found to be on file or not, the originating number counter is incremented per block 444, to indicate the number of times the originating number (ANI) has been used within a given time period.

Figure 3C:
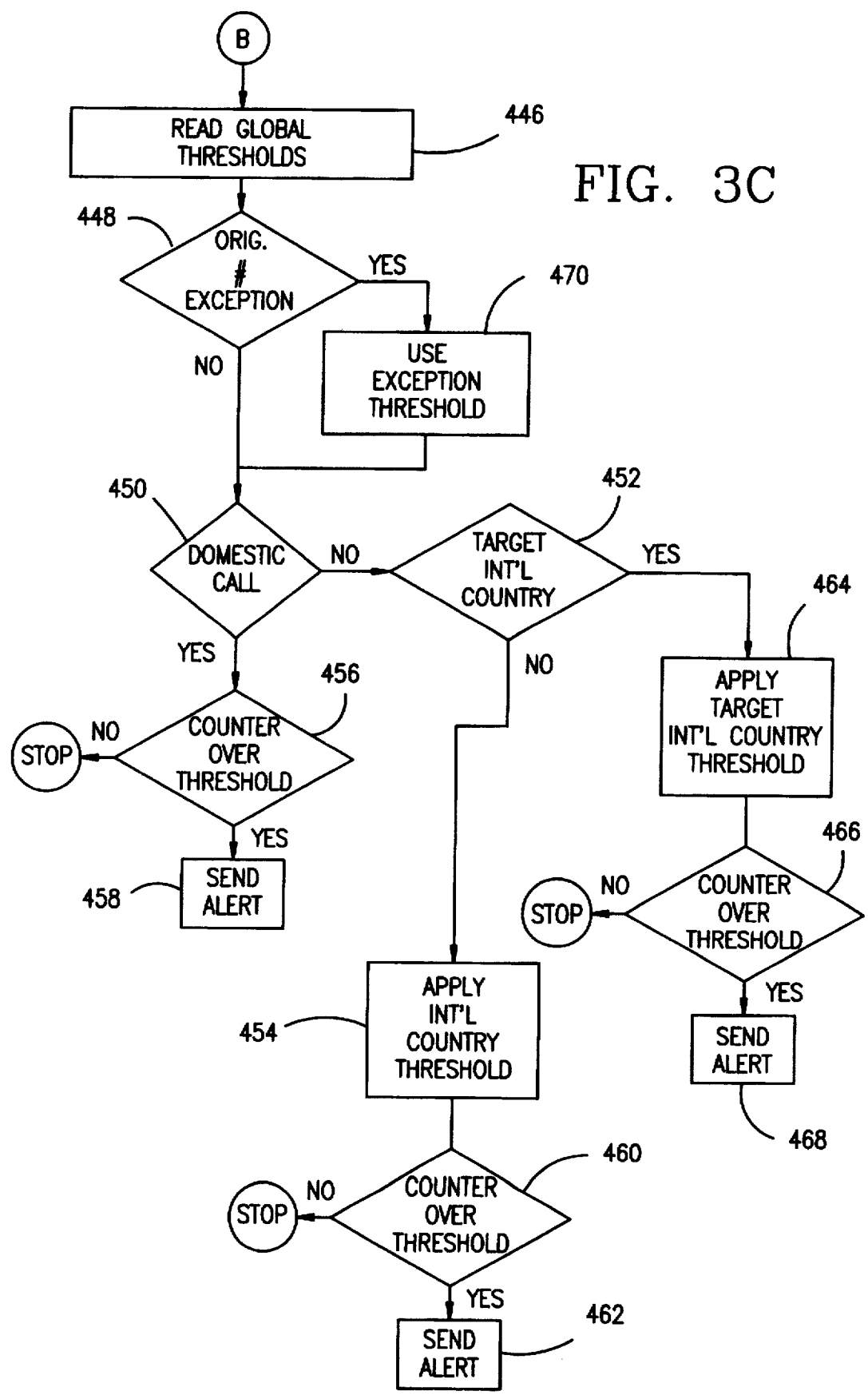
Figure 4:
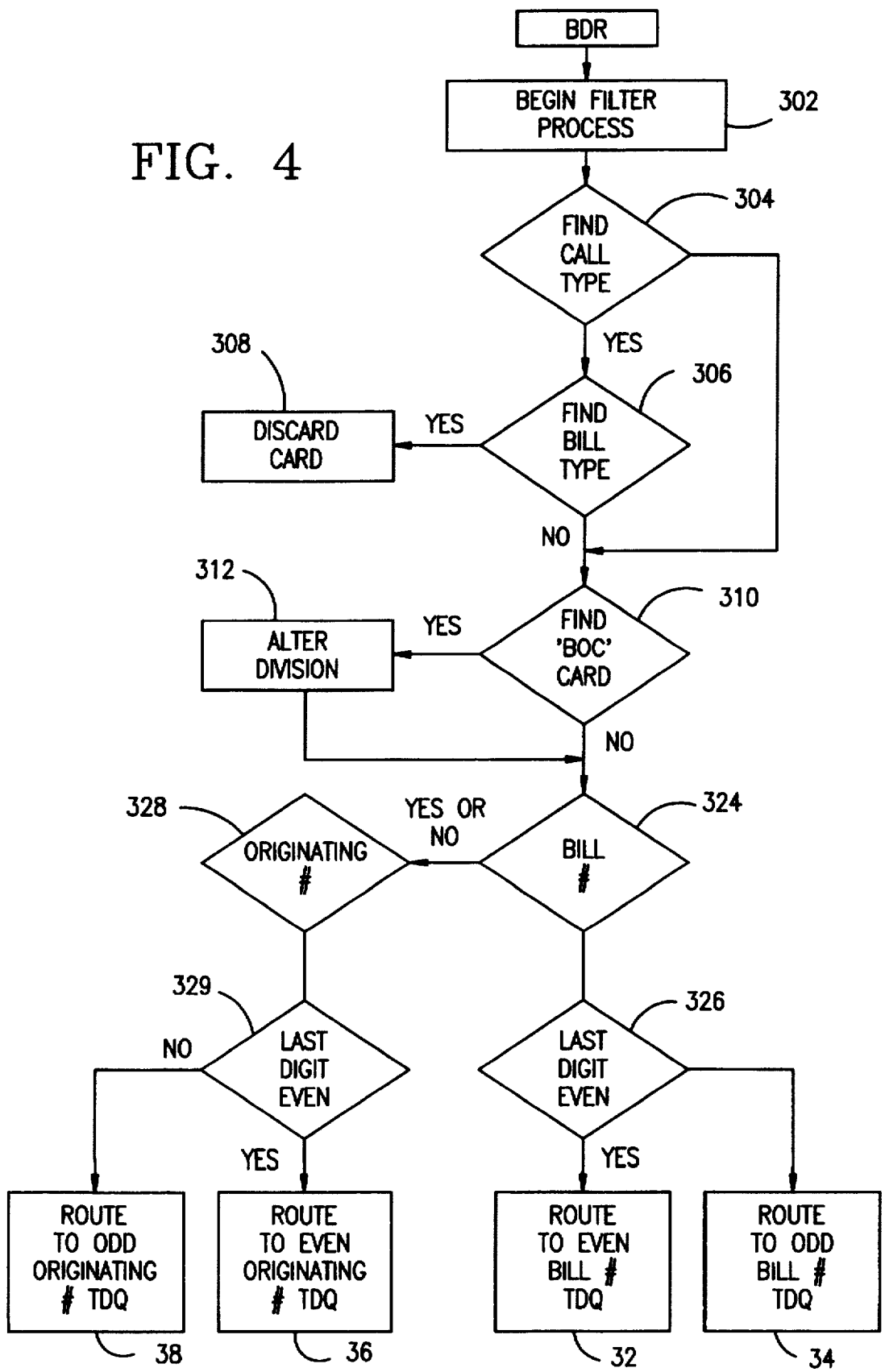
FIG. 4 is a flow chart detailing the functions performed by the fraud filter of FIG. 2.

As shown in FIG. 3C, after the usage of the originating number has been incremented, the global thresholds associated with the originating number are read in block 446. For the originating number module 42, similar to the billed number module, the global thresholds are also assumed to be for domestic, target international country and international country calls. If there is no originating number exception, the various determinations are made with respect to the global thresholds per blocks 450 (domestic call), 452 (target international country), and 454 (international country).

Similar to the billed number module operations, if the usage within a certain time period for the originating number does not exceed the predetermined threshold, the operation of the originating number module is stopped. If it does exceed the domestic call threshold, per block 456, an alert is sent to alert table 44, per block 458. If the originating number is deemed to be an international country, the international country threshold is provided at block 460. If that threshold is not exceeded, the operation of the originating number is stopped. If it is, an alert is sent per block 462 to alert table 44.

If the call is placed from the originating number to a target international country, the target international country threshold is applied per block 464. A decision is made on whether or not that threshold is exceeded in block 466. If it is not, the operation is stopped. If it is, an alert is sent per block 468 to alert table 44. It should be appreciated that although only one threshold is discussed with reference to each of the domestic, target international country and international country thresholds, multiple thresholds may in fact be used for each.

If there is an originating number exception threshold, as determined in block 448, the exception thresholds then overlay the global thresholds. These thresholds are then used in determining whether calls placed from that originating number exceed a certain usage for a given period of time per block 470. The determination of whether or not the exception threshold is exceeded can then be made.

The above discussion with respect to the fraud filter module, and the billed number and originating number modules operating thereunder, pertains to only one aspect of the fraud evaluation and reporting system of the present invention. There still remains two other aspects, namely the bad billed number module 26 to which a record with a BADBN header identification is sent and the call intercept module 34 to which a BDR record with a raised intercept flag is routed. The operations of the respective bad bill number and call intercept modules are discussed hereinbelow.

As was noted above, when host receiver 22 detects at the header of a record a bad billed or account number, for example designated by BADBN, that record is routed to the BBN module 26 via at least one transient data queue, as for example TDQ 24 shown in FIG. 2.

Figure 5A:
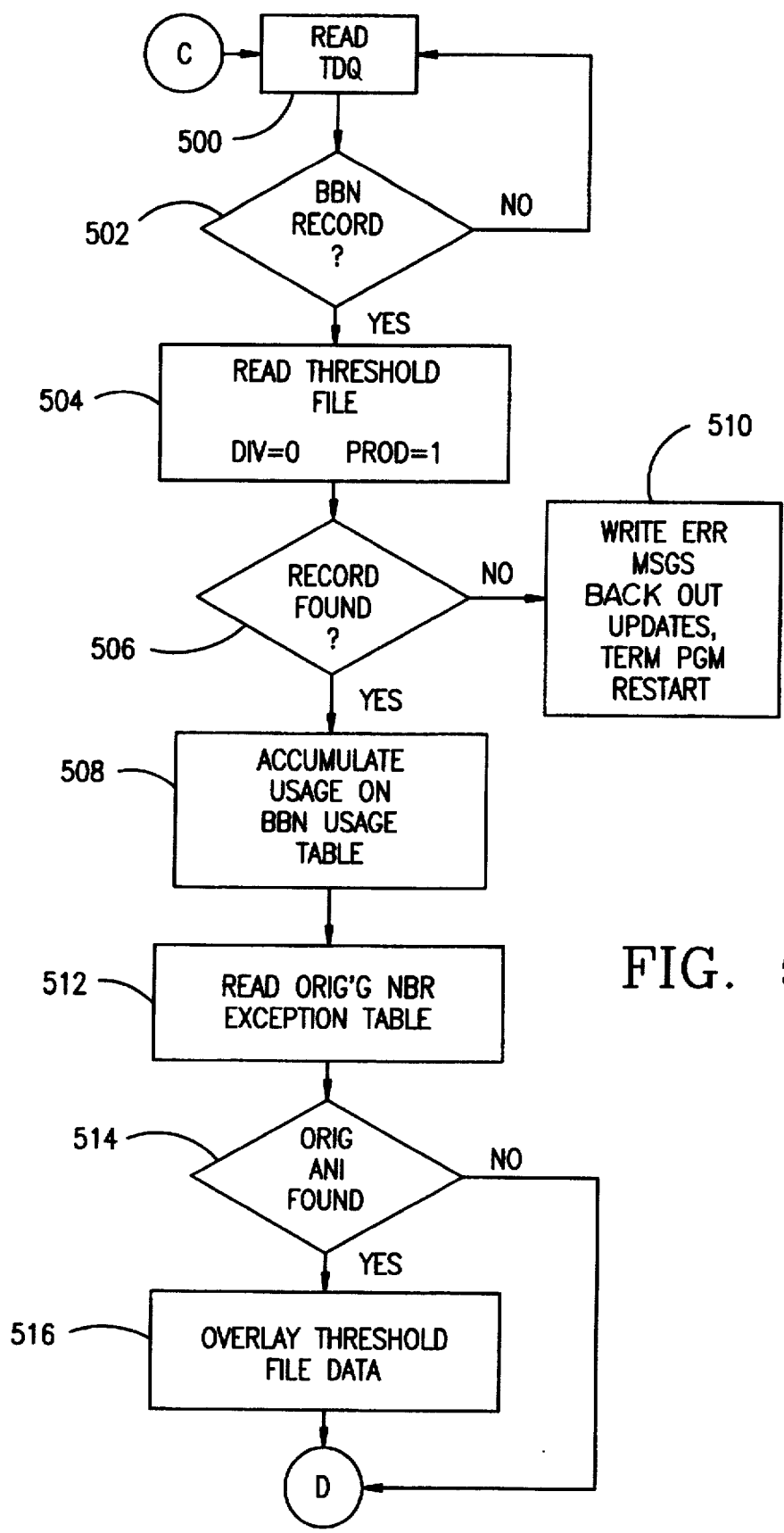
FIGS. 5A and 5B together provide a flow chart illustrating the operations of the bad billed number module of the instant invention system.
Figure 5B:
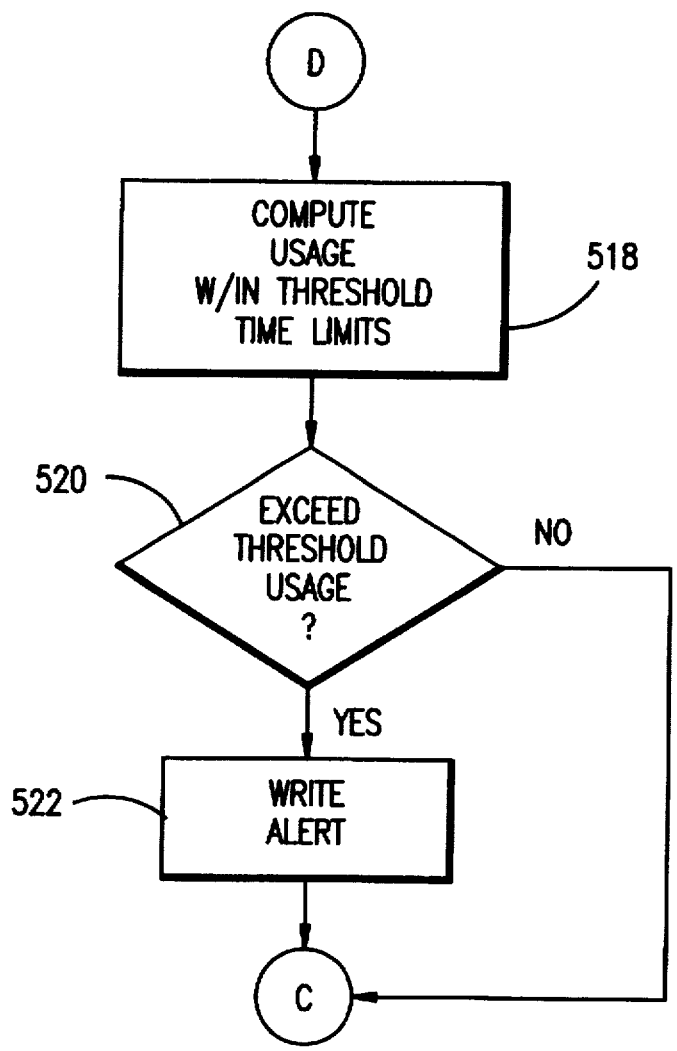

With reference to FIGS. 5A and 5B, the operations of the BBN module 26 proceed as follows. To begin, the records stored in TDQ 24 are read, one at a time, per block 500. If, per chance, the record has a header or some other indicator that designates it as other than a BBN record, then the next record from the TDQ 24 is retrieved. This is done in decision block 502. If indeed the record retrieved from the queue store is a BBN record, the operation proceeds to block 504 whereat a threshold file is read. For the bad billed number module, the threshold file contains a threshold record using division 0 and product 1 as record identification. For the instant invention system environment, it is assumed that there is no division 0. Accordingly, the designation of the division 0 signifies a bad billed or account number. And since it is assumed that the BBN module is meant to be operational for bad billed numbers, by setting the product threshold to 1, every time a bad billed number is received, the threshold is triggered. Of course, it should be appreciated that the BBN threshold can be altered for unforseen events. Putting it differently, the operators are given the option of altering the threshold(s) for triggering an alert for bad billed numbers.

If the record is found in the threshold file, per decision block 506, the usage of that bad billed number is accumulated to a BBN usage table per the operation indicated at block 508. It should be appreciated that this accumulation of bad billed numbers is based on originating numbers. In other words, every time that a call placed from an originating number and the bill number is bad, the usage for that originating number is incremented. However, if the threshold record is not found in the file, per operation of block 510, error messages are written, updates are backed out and the program is terminated, to be restarted a short time later.

Continuing with the operations of the BBN module, assuming that the bad billed usage has been accumulated in the BBN usage table, the next operation that takes place is the reading of the originating number exception table, per block 512. An originating number exception table is where the user has stored predetermined exceptions for the bad billed number module. In essence, an originating number exception threshold, once entered into the originating number exception table, when retrieved, would act as an override by providing a different threshold for the originating number, instead of the default threshold.

Returning to FIG. 5A, per operation indicated in block 514, if the originating number (or originating ANI) is found in the originating number exception table, the BBN threshold is overlaid per the operation shown in block 516. If it is not, the operation of the BBN module proceeds to block 518 whereat the usage within the threshold time limit is checked to see if the number of times calls generated from that originating number within a given time period has met the threshold. And per the operation in decision block 520, if the threshold is met, an alert record is written to the alert table 44 per the operation indicated in block 522. Thereafter, the next record is read from TDQ 24, as indicated by the operation designated by block 500. On the other hand, if the threshold is not met, the BBN application returns to block 500 to read the next record from TDQ 24. The sending of alert records from the BBN module to alert table 44 is indicated by lead 27 in FIG. 2.

As discussed above, upon receipt of a record, the host receiver 22 first reads the header, or some other portion of the record, to determine where to route the record. In the instance where the header of the record indicates a BDR, that record is checked to see if the intercept flag is set and if so, the record is routed to call intercept module 34. If BDR and intercept flags are not set, the record is routed to fraud filter module 30. See FIG. 2.

Figure 6:
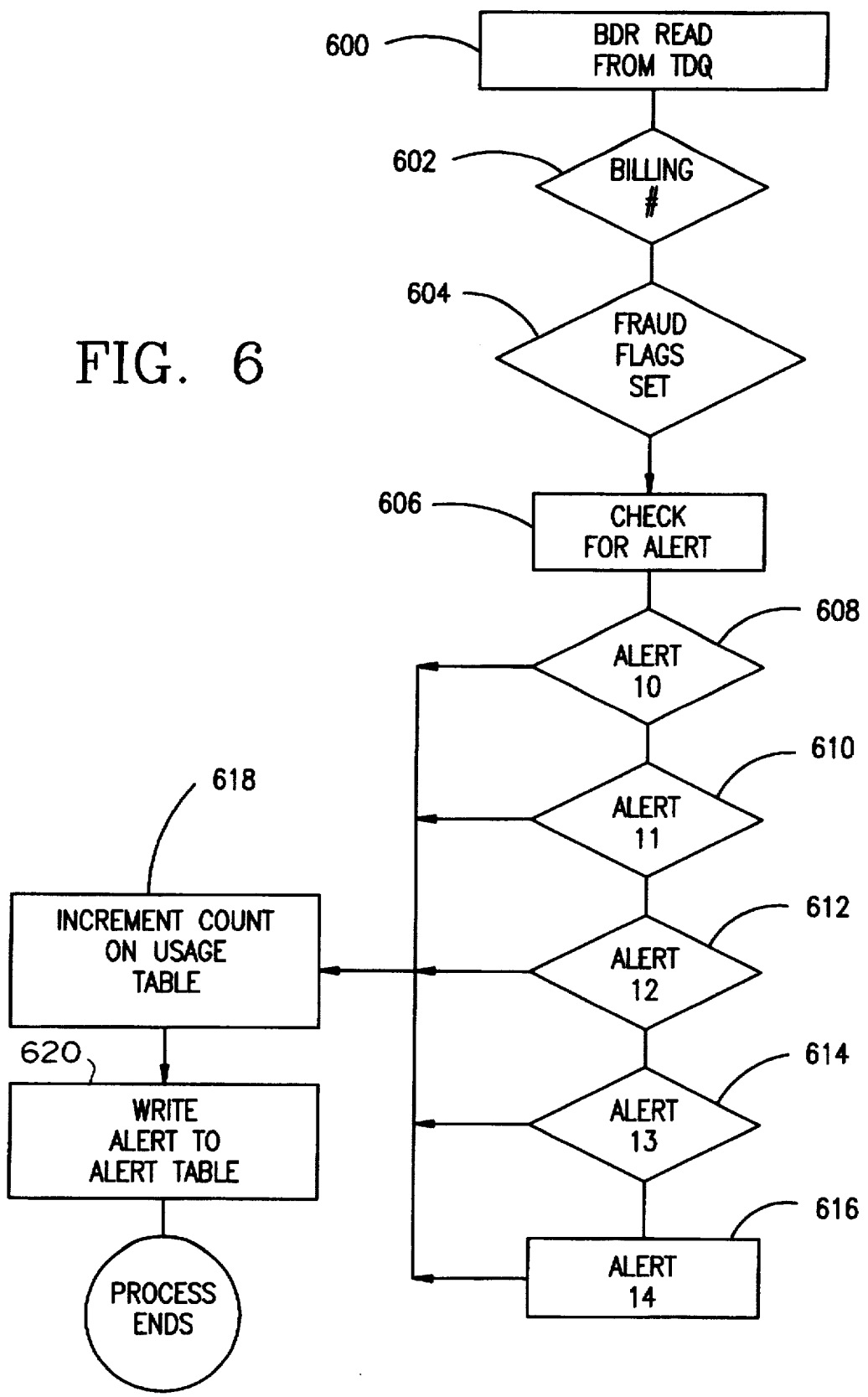
FIGS. 6 provides a flow chart illustrating the operations of the call intercept module of the instant invention.

As shown in FIG. 6, the call intercept module begins by reading a record from the intercept queue at block 600. The record must be a BDR and have a billing number and the intercept or fraud flags must be st on the record. These check steps are done in blocks 602 and 604, respectively. Records not meeting this criteria are discarded, while records passing these checks will go through the alert check processing beginning with block 606. Each record reaching the alert check will generate only one alert. The alert generated will be the alert check that matches the flag settings and status conditions on the BDR record. When the alert is triggered, the usage counter will be incremented (block 618) and the alert will be written to the alert table (block 620) which will cause the alert to display on the alert monitor. There are a plurality of alert checks, for example 9, represented by alerts 10, 11, 12, 13 and 14 (represented by blocks 608 to 616 each of which may be checked more than once in order to reach the exemplar 9 checks) that can trigger alerts. Each alert has specific checks and has a special meaning to the fraud analyst. These checks are represented by decision block 608 to 622 and reference the alerts given in the table of FIG. 8.

Based on alerts sent to the FEAR monitor, the fraud analyst determine what action they need to take. They can manually go in and set the transfer to fraud flag to "Y" on BNS which will cause the call to a specific billing number to be intercepted. Depending on the alerts generated from the Intercept process, the fraud analyst can then decide what further steps need to be taken to stop this fraudulent caller.

FIG. 7 is an exemplar alarm monitor screen as displayed on monitor 46 whereupon various alert data are on display. As shown, alerts previously established in the user's profile are shown according to the type of thresholds that have been exceeded. Although shown as being static, in actuality the monitor screen can roll continuously, refreshing itself approximately every 20 seconds. The user can also manually refresh the screen at any time.

As illustrated, for the entry designated 700, the TIMESTAMP indicates that the alert was generated on Jul. 15 at 3:21 pm. The column entitled DV indicates the division (or the accounting office/owner company) number to which the card is associated. The type of product for that alert is indicated as 08 under the heading PR. The alert type number for that call is identified as 3 under the heading AL. The billed number associated with the call is identified under BILLED, while the originating number from which the call is made is identified under the heading ORIGINATING. The terminating number for the call is identified under the heading TERMINATING. The site of the console from where the call comes through to the system is identified as 12 under the heading SI. The total number of calls or the number tied to a particular type of threshold within the designated period of time, in this instance 20, is identified under the heading USAGE.

Thus, given the exemplar screen of FIG. 7, it can be seen that the user of the billed number has made two domestic calls from two different originating numbers to two different terminating numbers. The caller also had made a call from Canada to Canada and has moreover made various calls from various foreign countries, including the targeted countries of Mexico and Poland. To enhance viewing of the fraud alert screen, the different types of fraud alerts, in addition to being numbered, are color coded. Thus, each time that a threshold has been exceeded, an alert signal is sent to the alert table whose data is retrieved and displayed.

With reference to the exemplar alert description given in the table of FIG. 8, it can be seen that the alert type numbers are tied to units of time, depending upon whether the threshold is hourly, daily or weekly. For example, for the first alert type identified, i.e. the originating hot number, the predetermined threshold time period is 1 hour and its display color is green on black. Note that hourly thresholds are set for every alert type, and that daily and weekly, in addition to hourly, thresholds can be set for certain alert types. Those alert types for the exemplar table of FIG. 8 are: excessive billed number usage (alert No. 3), excessive originating number usage (alert No. 4), international to non-targeted countries (alert No. 5) and international to targeted countries (alert No. 7).

To further interpret the FIG. 8 table, note that the alert number is preceded by "2" when the daily threshold is surpassed. For example, referencing the "excessive billed number usage", note that the daily threshold is shown on the monitor as alert number "23". Similarly, when the weekly threshold is surpassed, the alert number is preceded by "3". Thus, for alert type "international to targeted countries", the weekly threshold is exceeded for excessive number of calls, as indicated by the alert number "37". Do note that the fraud alert monitor displays only those alerts that have been defined in the user profile. Further note that different exemplar screens may be generated by the alarm monitor as different alert data are retrieved from alert table 44.

Inasmuch as the present invention is subject to many variation, modifications and changes in detail, it is intended that all matters throughout this specification and shown in the accompanying drawings be interpreted as illustrative only and not in a limiting sense. Accordingly, it is intended that the invention be limited only by the spirit and scope of the appended claims.

We claim:

1. In a telecommunications network, a system to monitor in real time special service calls to detect fraudulent activity, comprising:

routing means for selectively retrieving records of said calls in progress having account details and directing said records to be stored in at least one queue means;

means for retrieving one at a time from said queue means each of said stored records of a corresponding call in progress and analyzing the type of call and the type of account associated with said each record;

processor means for comparing, for each said corresponding call in progress, either the type of account number of said each record having an account number associated with one of a plurality of account number store means with at least one predetermined threshold relating to account numbers associated with said one account number store means or the originating number of said each record having an originating number associated with one of a plurality of originating number store means with at least one predetermined threshold relating to originating numbers associated with said one originating number store means to determine whether said each record has exceeded either of said at least one thresholds;

means for providing an alert when said each record is found to exceed said either one threshold.

2. System of claim 1, wherein said routing means further routes the records of said calls having bad account numbers to at least one second queue means, said system further comprising:

means for retrieving one at a time from said second queue means the stored bad account number records for determining the usage of each of the bad account numbers;

said processor means outputting an alert to an alert store if the usage for a bad account number exceeds a given threshold within a predetermined time.

3. System of claim 2, further comprising:

an exception store in which predetermined originating numbers are stored;

wherein if a bad account number matches one of said predetermined originating numbers from said exception store, said given threshold is replaced with another predetermined threshold associated with said one matched originating number so that said processor means outputs an alert to said alert store only when the usage of bad account numbers matching said one predetermined originating number exceeds said another predetermined threshold.

4. System of claim 2, further comprising:

means for displaying said alert to indicate potential fraudulent activities.

5. System of claim 1, further comprising:

means for intercepting each of said calls having associated therewith an account detail record indicating that said call is to be intercepted for determining whether the caller of said each call and/or the account number to which said each call is billed is valid;

wherein said routing means further directs said each to be intercepted calls to at least one third queue means for retrieval, one at a time, by said intercepting means.

6. System of claim 5, further comprising:

a store for storing invalid account numbers;

wherein when a call is intercepted, said processor means compares the account number under which said intercepted call is placed with the account numbers in said store;

wherein if said intercepted account number is found in said store, said processor directs said intercepted call to an operator for further verification; and wherein if said intercepted account number is not found in said store, said processor means proceeds to process the call.

7. System of claim 6, wherein after said operator has verified that the caller of said intercepted account number is a valid caller, said processor means outputs an alert to an alert table and proceeds to process the call.

8. System of claim 6, further comprising:

intercept counter means for keeping a record of the number of times calls have been placed using said intercepted account number;

wherein if the number of times calls placed under said intercepted account number has exceeded a threshold, said processor means directs the threshold exceeded call to another operator for further verification;

whereupon said another operator determines whether or not the caller of said threshold exceeded call is a valid caller.

9. System of claim 1, wherein said plurality of account number store means are divided into even and odd stores into which even and odd account numbers are stored, respectively, each of said first store means associating the account numbers stored therein or directed thereto with at least particular thresholds and product or service types;

wherein said each record having an account number is routed to one of said first store means whose product or service type corresponds to said each record so that the type of account number of said each record can be compared with at least one of said particular thresholds related to the particular product or service.

10. System of claim 9, wherein said thresholds comprise domestic threshold, international country threshold, and international target country threshold.

11. System of claim 9, further comprising:

exception store for storing a plurality of predefined account numbers each having a corresponding threshold;

wherein if the account number of said each record having an account number matches one of said predefined account numbers, said at least one particular threshold is replaced with the threshold corresponding to the matched account number so that an alert is provided only when the usage of the account number of said each record matching said predefined account number exceeds said corresponding threshold.

12. System of claim 1, wherein said plurality of originating number store means are divided into even and odd stores into which respective even and odd numbers are stored, respectively, each of said second store means associating the originating numbers stored therein or directed thereto with particular thresholds and product or service types;

wherein said each record having an originating number is routed to one of said second store means whose product or service type corresponds to said each record so that the type of originating number of said each record can be compared with at least one of said particular thresholds related to the particular product or service.

13. System of claim 12, wherein said thresholds comprise domestic threshold, international country threshold, and international target country threshold.

14. System of claim 12, further comprising:

exception store for storing a plurality of predefined origination numbers each having a corresponding threshold;

wherein if the originating number of said each record having an originating number matches one of said predefined originating numbers, said at least one particular threshold is replaced with the threshold corresponding to the matched originating number so that the alert is provided only when the usage of the originating number of said each record matching said predefined account number exceeds said corresponding threshold.

15. In a telecommunications network, a method of monitoring in real time special service calls to detect fraudulent activity, comprising the steps of:

(a) selectively retrieving records of said calls having account details while said calls are in progress;

(b) storing said records each having a corresponding call in progress in at least one queue means;

(c) retrieving one at a time from said queue means each of said stored records;

(d) analyzing the type of call and the type of account associated with said each record;

(e) comparing, as its corresponding call is in progress, either the type of account number of said each record having an account number associated with one of a plurality of account number store means with at least one predetermined threshold relating to account numbers associated with said one account number store means or the originating number of said each record having an originating number associated with one of a plurality of originating number store means with at least one predetermined threshold relating to originating numbers associated with said one originating number store means to determine whether said each record has exceeded either of said at least one thresholds; and (f) providing an alert when said each record is found to exceed said either one threshold.

16. Method of claim 15, wherein said step (a) further comprises the step of:

routing the records of said calls having bad account numbers to at least one second queue means;

wherein said method further comprises the steps of:

retrieving one at a time from said second queue means the stored bad account number records;

determining the usage of each of the retrieved bad account numbers;

outputting an alert to an alert store if the usage for a bad account number exceeds a given threshold within a predetermined time.

17. Method of claim 16, further comprising the steps of:

storing predetermined originating numbers in an exception store;

matching each bad account number with said predetermined originating numbers from said exception store so that if a bad account number matches one of said predetermined originating numbers from said exception store:

replacing said given threshold with another predetermined threshold associated with said one matched originating number; and outputting an alert to said alert store only when the usage of bad account numbers matching said one predetermined originating number exceeds said another predetermined threshold.

18. Method of claim 16, further comprising the step of:

displaying said alert to indicate potential fraudulent activities.

19. Method of claim 15, further comprising the steps of:

intercepting each of said calls having associated therewith an account detail record indicating that said call is to be intercepted;

storing the intercepted calls in at least one third queue means;

retrieving, one at a time, each of said intercepted calls from said third queue means;

determining whether the caller of said each intercepted call and/or the account number to which said each intercepted call is billed is valid.

20. Method of claim 19, further comprising the steps of:

storing invalid account numbers in an invalid number store;

wherein when a call is intercepted, comparing the account number under which said intercepted call is placed with the account numbers in said invalid number store;

wherein if said intercepted account number is found in said store, directing said intercepted call to an operator for further verification; and wherein if said intercepted account number is not found in said store, proceeding to process the call.

21. Method of claim 20, wherein after said operator has verified that the caller of said intercepted account number is a valid caller, further comprising the steps of:

outputting an alert to an alert table; and processing the call.

22. Method of claim 21, further comprising the steps of:

keeping a record of the number of times calls have been placed using said intercepted account number in an intercept counter means;

wherein if the number of times calls placed under said intercepted account number has exceeded a threshold, directing the threshold exceeded call to another operator for further verification of whether or not the caller of said threshold exceeded call is a valid caller.

23. Method of claim 15, wherein said account number store means are divided into even and odd stores into which even and odd account numbers are stored, respectively, each of said first store means associating the account numbers stored therein or directed thereto with at least particular thresholds and product or service types;

routing said each record having an account number to one of said first store means whose product or service type corresponds to said each record; and comparing the type of account number of said each record with at least one of said particular thresholds related to the particular product or service.

24. Method of claim 23, wherein said comparing step comprises the step of:

comparing the account number of said each record with at least a domestic threshold, an international country threshold, or an international target country threshold.

25. Method of claim 23, further comprising the steps of:

storing a plurality of predefined account numbers each having a corresponding threshold in an exception store;

wherein if the account number of said each record having an account number matches one of said predefined account numbers, replacing said at least one particular threshold with the threshold corresponding to the matched account number; and providing an alert only when the usage of the account number of said each record matching said predefined account number exceeds said corresponding threshold.

26. Method of claim 15, wherein said originating number store means are divided into even and odd stores into which respective even and odd numbers are stored, respectively;

associating the originating numbers stored in or directed to each of said second store means with particular thresholds and product or service types;

routing said each record having an originating number to one of said second store means whose product or service type corresponds to said each record; and comparing the originating number of said each record with at least one of said particular thresholds related to the particular product or service.

27. Method of claim 26, wherein said comparing step comprises the step of:

comparing the originating number with at least a domestic threshold, an international country threshold, or an international target country threshold.

28. Method of claim 26, further comprising the steps of:

storing a plurality of predefined origination numbers each having a corresponding threshold in an exception store;

wherein if the originating number of said each record having an originating number matches one of said predefined originating numbers, replacing said at least one particular threshold with the threshold corresponding to the matched originating number; and providing an alert only when the usage of the originating number of said each record exceeds said threshold corresponding to said matched originating number.

* * * * *